United States Patent [19]

Young, III

[11] Patent Number: 5,694,467
[45] Date of Patent: Dec. 2, 1997

[54] INTEGRATED SOUND/TELEPHONE HEADSET SYSTEM

[75] Inventor: Francis A. Young, III, Corvallis, Oreg.

[73] Assignee: Hewlett Packard Company, Palo Alto, Calif.

[21] Appl. No.: 644,806

[22] Filed: May 10, 1996

[51] Int. Cl.$^6$ .................................................. H04M 1/00
[52] U.S. Cl. ........................ 379/430; 379/214; 379/267; 379/101
[58] Field of Search .................................... 379/430, 428, 379/214, 218, 267, 101, 110, 88; 381/183, 187

[56] References Cited

U.S. PATENT DOCUMENTS

| | | | |
|---|---|---|---|
| 4,517,413 | 5/1985 | Pavitt, Jr. .................. | 379/110 |
| 5,099,514 | 3/1992 | Acree ....................... | 379/430 |
| 5,483,579 | 1/1996 | Stogel ...................... | 379/88 |
| 5,504,812 | 4/1996 | Vangarde .................. | 379/430 |

OTHER PUBLICATIONS

Helloset, Use your headset without lifting the handset, Dec. 1993.

*Primary Examiner*—Jack Chiang

[57] ABSTRACT

An integrated sound/telephone headset system is provided comprising a music source, a telephone, a headset having a microphone and earphones, and a control system. The control system receives music from the music source, a telephone ring signal from a telephone line, the telephone audio, and ambient sounds received by the microphone. A handset lift device is manually actuated by the user to select between a bypass mode and operational modes. When operating in the bypass mode, the phone is answered with its handset, and the headset is connected to a mixer with audio input from the music source, the ambient sounds, and a ring tone indicating a ring signal on the telephone line. When in the operational modes, a user initiates or answers a call by lowering the microphone, which switches the headset from the mixer to the telephone and connects the telephone to the telephone line. At the end of the conversation, the user reverses these actions by raising the microphone to switch the headphones back to the mixer and disconnecting the phone from the phone line.

16 Claims, 3 Drawing Sheets

INTEGRATED SOUND/TELEPHONE HEADSET SYSTEM

BACKGROUND OF THE INVENTION

1. Technical Field

The present invention relates to improvements in sound headset systems and telephone headset systems.

2. Description of the Related Art

When working in a noisy or distracting environment, it is useful to be able to isolate oneself through the use of headphones that are playing a music source such as a CD player or a cassette tape player. Unfortunately, this also prevents one from hearing the telephone ring and increases the difficulty of answering the telephone. Answering the phone in such a situation requires at least three steps: 1) remove headphones, 2) turn off music, 3) pick up telephone. In addition, if one spends a lot of time on the telephone, a headphone/microphone type headset for a telephone is vastly preferable to the standard telephone handset. If the advantages of both systems are desired, the use of both headphones for music and a telephone headset for operating a telephone further increases the difficulty of the task of switching from music to the phone and back again.

SUMMARY OF THE INVENTION

According to the present invention, an integrated sound/telephone headset system is provided comprising a sound-generating device, a telephonic instrument, a headset, means for indicating a mode, and a control system. The sound-generating device transmits electrical signals representative of sound. The telephonic instrument is capable of being coupled to a public switched telephone network, and transmits electrical signals representative of sound and receives microphone electrical signals for transmission on the public switched telephone network. The headset converts received electrical signals into sound, and has a microphone for transmitting microphone electrical signals that represent sound detected by the microphone. The control system is connected to the sound-generating device, the telephonic instrument, the headset, and the means. The control system connects the headset to at least one of the sound-generating device and the telephonic instrument as a function of the indicated mode. The above, as well as additional objects, features, and advantages of the present invention, will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is an integrated sound/telephone headset system that provides three Modes:

1) Bypass Mode (handset lifter down, mic position up or down). A Phone is used as a normal telephone that is answered with its handset, and a user headset is connected to a mixer with audio input from a Music Source, a mic detecting ambient noise, and the ring tone from the Phone.

2) Telephone Mode (handset lifter up, mic position down). The Phone is operated from the headset, the handset is disconnected, and the Music Source is paused.

3 Music Mode (handset lifter up, mic position up). The headset is connected to the mixer with audio input from the Music Source, a mic detecting ambient noise, and the ring tone from the Phone. The Phone is disconnected from the phone line, but the Phone may be answered from the headset by entering the Telephone Mode.

The system is manually switched between Modes by the user. A handset lift device is manually actuated by the user to select between the Bypass Mode and the operational modes (Telephone Mode and Music Mode). When the handset lift device is in the non-lifted position, the system is set in the Bypass Mode. When the handset lift device is lifted, the system is set in the operational modes of either the Music Mode or the Telephone Mode. The operational mode is selected by positioning the headset microphone (mic). When the headset microphone is in the up position (over the head, out of the way), the system is placed in the Music Mode. When the telephone is desired, the microphone is swung down into a position in front of the user's mouth. This motion causes the system to switch from the Music Mode to the Telephone Mode. At the end of the conversation, the microphone is swung back up to the normal position and the system switches back to Music Mode.

Figure 1:
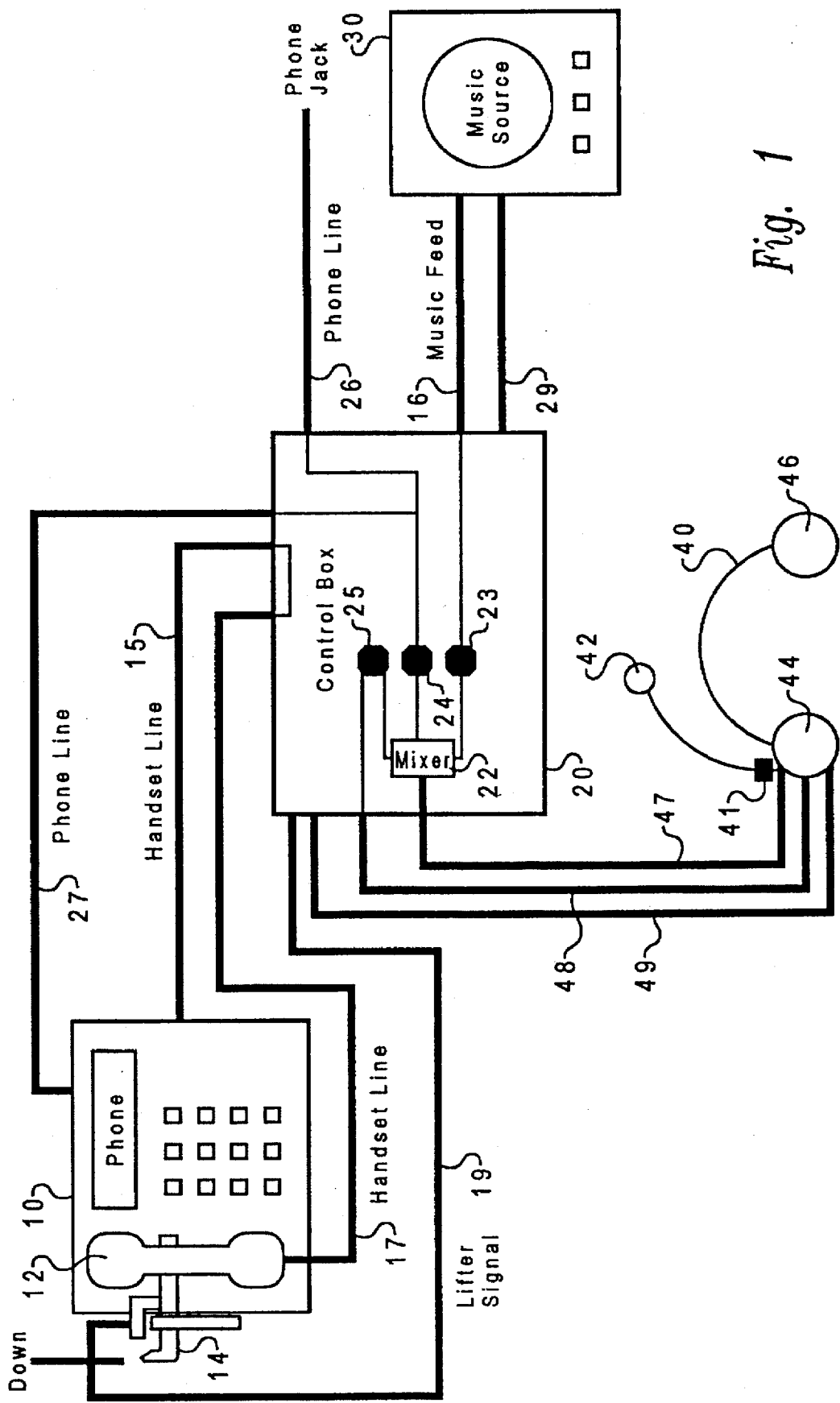
FIG. 1 shows a schematic block diagram of the integrated sound/telephone headset system of the present invention operating in the Bypass Mode, in accordance with a preferred embodiment of the present invention.

With reference now to the figures, and in particular with reference to FIG. 1, there is shown a schematic block diagram of the integrated sound/telephone headset system of the present invention operating in the Bypass Mode. The integrated sound/telephone headset system comprises a telephonic instrument (Phone) 10, a Control Box 20, a sound-generating device (Music Source) 30, and a headset 40, all of which are interconnected as shown in FIG. 1.

As shown in FIG. 1, the system is configured in the Bypass Mode, where the telephone system and the music source system operate independently. Phone 10, Music Source 30, and headset 40 are all connected to Control Box 20. Phone Line 27 and Handset Line 15 from Phone 10 are connected to Control Box 20. Handset 12 is connected to Control Box 20 via Handset line 17. In the Bypass Mode, Control Box 20 connects the Phone Line 27 of Phone 10 with Phone Line 26, which connects the phone to the public switched telephone network at the Phone Jack, and connects Handset Line 15 to Handset Line 17, which connect handset 12 to Phone 10. When in the Bypass Mode, the Phone Line is passed through to the Phone 10 so that the Phone 10 and handset 12 are connected directly to the outside telephone line. The telephone rings as usual and the user answers it (or places a call) by lifting the handset as is normal. The headset is not usable with the telephone, but functions like a normal pair of headphones attached to Music Source 30.

Music Source 30 is connected to Control Box 20 through a Music Feed 16 over which the Music Source 30 transmits electrical signals representative of sound. Control Box 20 provides a pause control sent over Pause line 29 to temporarily pause the Music Source 30 when the system is operating in the Telephone Mode. Remote pause relies on the Music Source having input for a remote pause switch. This control may be electrical, or an infrared (IR) pause signal, or an actuating mechanical switch. If Music Source 30 only has a pause button on the device, a solenoid could be clamped in position over the button to be activated by the pause signal from Control Box 20, and thereby mechanically pausing the Music Source 30 on command. Although in a preferred embodiment the sound source provided by the sound-generating device 30 is music, other sounds, such as voice or tones or inverted-ambient sound waves, as used in a sound suppression system, may also, or alternatively, be provided by sound-generating device 30.

Phone 10 is a standard analog or digital telephone used to access the public switch telephone network. A preferred phone would be headphone compatible having earphone and microphone level adjustments and electrical compatibilities. Also, Phone 10 is equipped with a handset lifter 14 that is operated manually to lift handset 12 from Phone 10 to place the handset 12 "off-hook". Handset lifter 14 is fixedly attached to Phone 10 and is equipped with an offset, pivoted, cross-bar that rests under the handset 12. A handle is attached to the cross-bar to allow manual actuation of the cross-bar, causing the cross-bar to rotate and lift the handset "off-hook". A tab to the side of the cross-bar depresses a microswitch when the cross-bar is in a down position and releases the switch when in an up position. This open/closed state generates a Lifter Signal that signals to the Control Box 20 whether the handset is "on-hook" or "off-hook". A mechanical device similar to the handset lifter is produced by Hello Direct, Inc., as part of its "HelloSet" headset-telephone. As will be appreciated, a microswitch for detecting the handset lifer's position can be simply added to such a mechanical device.

The Lifter Signal is sent via line 19 from handset lifter 14 to Control Box 20 to indicate the position (i.e., signals an "up" or "down" position) of handset lifter 14, and thus whether handset 12 is "off-hook". When the system is operating in the Bypass Mode, as shown in FIG. 1, the system user has actuated handset lifter 14 to a down position so that handset 12 rests in Phone 10. This places the Phone "on-hook", and allows the Phone to operate as a standard telephone. The Lifter Signal sent to Control Box 20 configures Control Box 20 in the Bypass Mode, as shown in FIG. 1.

Figure 2:
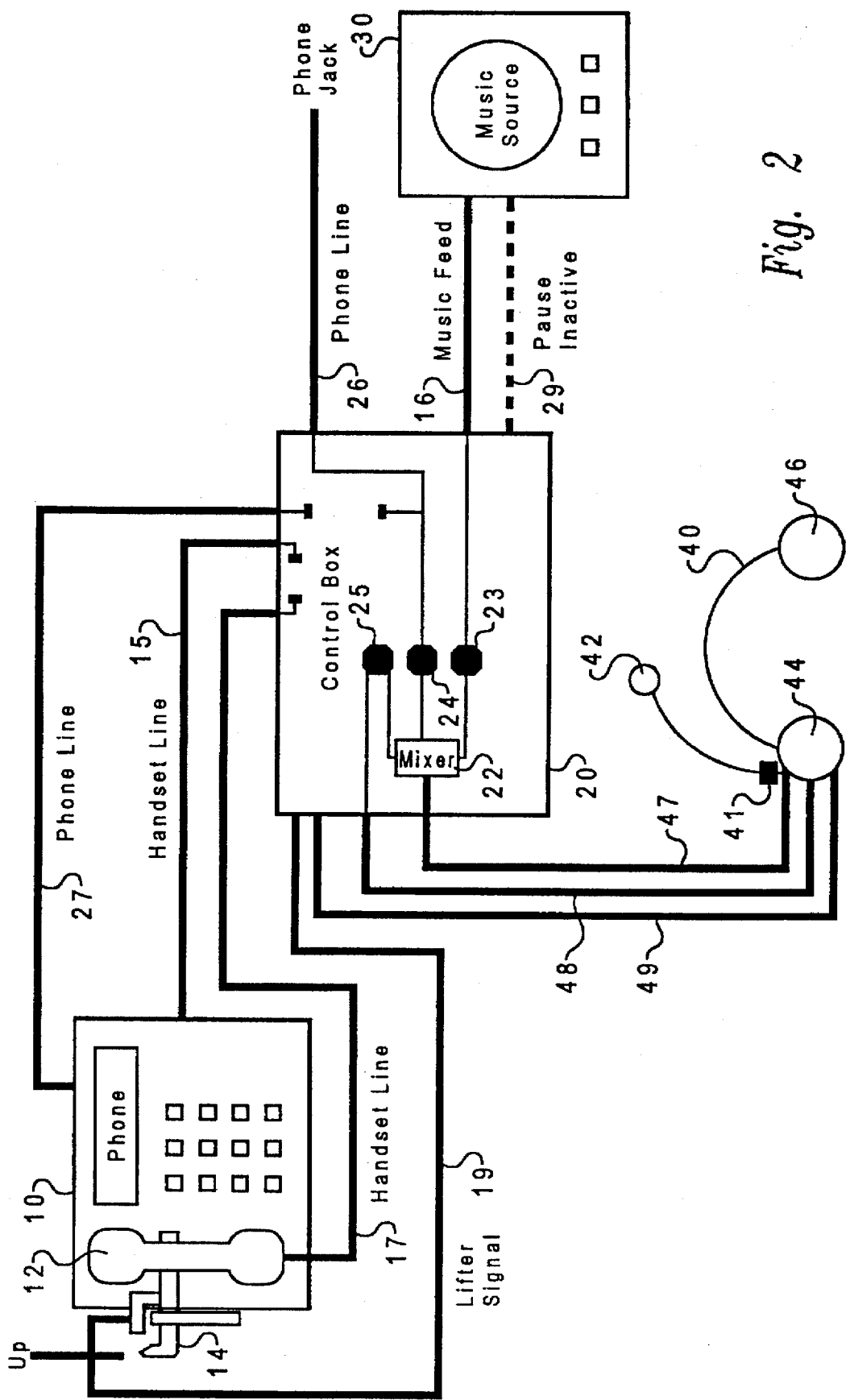
FIG. 2 shows a schematic block diagram of the integrated sound/telephone headset system of the present invention operating in the Music Mode, in accordance with a preferred embodiment of the present invention.
Figure 3:
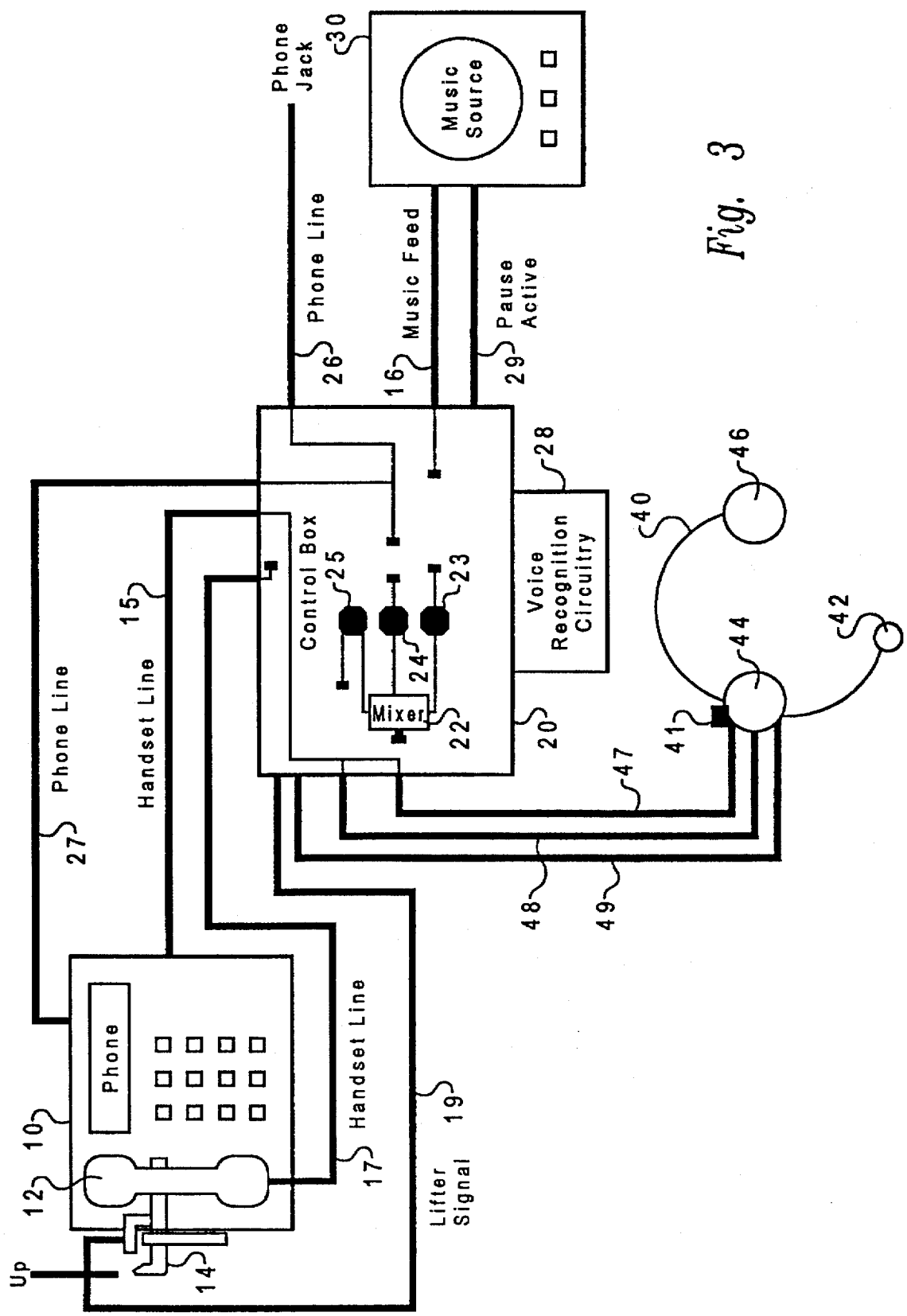
FIG. 3 shows a schematic block diagram of the integrated sound/telephone headset system of the present invention in the Telephone Mode, in accordance with a preferred embodiment of the present invention.

Headset 40 has three connections to Control Box 20: Audio Line 47, Mic Feed 48, and Position Signal line 49. A Position Signal, generated by a microswitch 41 on an actuating microphone 42 attached to the headset 40, is transferred over Position Signal line 49 to indicate the position of the microphone. The microswitch 41 on headset 40 sends a first signal when the microphone is in a first position, for example, over the head of the user such as is shown in FIG. 2, or sends a second signal (or lack of the first signal) when the microphone is positioned in a second position, for example, such as in front of the mouth of the user as shown in FIG. 3. The second connection from headset 40 is a Mic Feed 48 connected to the microphone 42 for transmitting microphone electrical signals to Control Box 20 that represent sound detected by the microphone. The third connection is the Audio Line 47 for the earphones 44, 46 (i.e., headphone speakers), which convert received electrical signals into sound within the headset.

Control system 20 includes a mixer 22 that mixes multiple electrical signals that generate sound and sends the mixed signals to headset 40 via audio line 47. Mixer 22 is a standard off-the-shelf mixer that is capable of blending or mixing various audio inputs. As seen in FIG. 1, the Music Feed 16 is input into mixer 22 through a signal attenuator 23, which provides a music volume control. A ring signal on the public switched telephone network directed to Phone 10 is detected by Control Box 20, passed through attenuator 24 to provide a Ring Volume, and input to mixer 22. The output signals from microphone 42, which provides ambient noise, are received over Mic Feed 48, are input into attenuator 25 to provide a Mic Volume, and then input into mixer 22. Attenuators 23–25 allow a user to mix the volume levels of the input sounds to headset 40 to a desired level. The mixed signals are output from mixer 22 to earphones 44, 46 of headset 40 where the mixed signals are converted into sound.

As will be appreciated, ambient noise within the environment of the user is detected by microphone 42, passed through attenuator 25 and mixer 22, and returned to earphone 44, 46. This allows the user to use the microphone as an adjustable room monitor, while allowing the user to control the degree of "isolation" from the surroundings. In addition, the mixer allows a user to set the music volume as desired, and to control the "ringing" volume so they can still hear the telephone ring while listening to music. However, to answer the telephone, while operating in the Bypass Mode, the user must lift handset 12 from Phone 10 and operate Phone 10 as a standard telephone.

Referring now to FIG. 2, there is shown a schematic block diagram of the integrated sound/telephone headset system of the present invention operating in the Music Mode, in accordance with a preferred embodiment of the present invention. As seen in FIG. 2, the Control Box 20 feeds the audio output from the Music Source 30 through the 3-input mixer 22 into headset 40 to allow the user to listen to their music. In this mode, the microphone 42 "sound pick-up" is also fed into the mixer, along with a ring tone generated by the Control Box 20 when it senses a ring signal on the Phone Line 26. In the Music Mode, the telephone 10 is not connected to the Phone Line 26 and thus, even though the handset is "off-hook" because the handset lift device 14 is in the operational "up" position, the telephone is not active because Control Box 20 has disconnected Phone Line 26 from Phone Line 27. Also, Control Box 20 does not provide a pause control over line 29 (i.e., Pause Inactive). When the telephone rings while in this Mode, the user simply lowers the microphone to switch to the Telephone Mode.

As will be appreciated, the connection of Control Box 20 to both the Phone Line 27 of Phone 10 and the Phone Line 26 connected to the Phone Jack provides the ability to detect a telephone ring signal and "pick-up" the telephone. Also, the connection to the Handset Line 15 of Phone 10, and to the Handset Line 17 of handset 12 provides the ability to route the earphone and microphone functions of the telephone to either the handset 12 or the headset 40.

Referring now to FIG. 3, there is shown a schematic diagram of the integrated sound/telephone headset system of the present invention in the Telephone Mode, in accordance with a preferred embodiment of the present invention. Handset lifter 14 has been actuated to the up position, lifting handset 12 "off-hook" to place the system in the operational modes. The Position Signal on line 49 indicates that microphone 42 is in the down position, thereby setting the system to Telephone Mode. Control Box 20 pauses Music Source 30 by a Pause Active signal over line 29, and disconnects mixer 22 from the Audio Line 47. Audio Line 47 is connected to the audio signals of Handset Line 15, and Mic Feed 48 is connected to the voice line of Handset Line 15.

As will be appreciated, when operating in the Telephone Mode, the Music Source 30 has been paused, all inputs from mixer 22 have been disabled, and headset 40 is connected to Phone 10 to operate as a standard telephone. Also, Phone Line 26 has been connected to Phone Line 27 placing Phone 10 "on-line" to the public switched telephone network, thereby "answering" the phone call. Similarly, the user initiates a call by lowering the microphone to switch to the Telephone Mode and then dialing with the standard telephone dial on Phone 10. Thus, when the user moves microphone from the up-position to the down-position, the headset earphones are switched from the music source to the telephone audio output, the microphone is connected to the telephone audio input, and the telephone is connected to the telephone line, simultaneously. Since the telephone is already "off-hook" by virtue of the handset lifter 14 being in the operational position (up), this procedure effectively "answers" the telephone and allows the user to carry on a conversation through headset 40. At the end of the conversation, the user reverses these actions by raising the microphone 42 to switch back to the Music Mode, which disconnects Phone 10 from the public switched telephone network.

As will be appreciated, the Control Box 20 may perform adjustments to compensate for differences in telephone construction that effect headphone volume and so on. Also, as will be appreciated, the preferred embodiment utilizes an analog phone, but the present invention would operate identically with digital or other type telephones but would require the appropriate modifications to the system design to compensate for the differences in phone operation.

In alternative embodiments of the present invention, the Mode of the system would be detecting by user, voice input, instead of manual input (i.e. actuating the handset lifter and microphone). Control Box 20 may contain voice recognition circuitry 28 (as shown in FIG. 3), which is connected to Mic Feed 49 (this connection is not shown in the figure). Voice recognition circuitry 28 detects verbal commands from the user through microphone 42 and places the integrated sound/telephone headset system in the Bypass Mode, Music Mode, or Telephone Mode, as is directed by the verbal commands of the user, and independently from the microphone or handset lifter positions. In still another alternative embodiment, Control Box 20 can be designed to automatically switch the system from the Music Mode to the Telephone Mode when a telephone ring signal is detected on Phone Line 26.

In another alternative embodiment, the headset unit 40 is a cordless arrangement using bi-directional infrared links. A base unit would have an infrared transmit/receive tower similar to those used by cordless stereo headphones. The tower would transmit the music/telephone audio signals (ring tone, ambient noise, music, phone audio, etc.) to the cordless headphone set 40. The tower would also receive infrared signals transmitted by the headset representing the audio signals from its microphone, and a coded signal that informs the base unit as to the position of the microphone, as is required to determine the operational Mode.

In still another alternative embodiment, a computer system is connected to control box 20. During the Bypass or Telephone Modes, the microphone 42 can be connected to the computer through voice recognition circuitry 28 to allow voice commands to be sent to the computer. Also, while operating in any of the modes, a sound synthesis output from the computer can be mixed into Audio Line 47 to provide computer generated voice or other sound to provide information to the user through earphones 44, 46.

While the invention has been particularly shown and described with reference to a preferred embodiment, it will be understood by those skilled in the art that various changes in form and detail may be made therein without departing from the spirit and scope of the invention.

What is claimed is:

1. An integrated sound/telephone headset system, comprising:

at least one sound-generating device that transmits electrical signals representative of sound;

a telephonic instrument capable of being coupled to a public switched telephone network and that transmits electrical signals representative of sound and that receives microphone electrical signals for transmission on the public switched telephone network;

a headset that converts received electrical signals into sound, said headset including a microphone for transmitting microphone electrical signals that represent sound detected by the microphone;

indicating means for indicating a mode; and a control system connected to the sound-generating device, the telephonic instrument, the headset, and the indicating means, wherein the control system connects the headset to at least one of the sound-generating device and the telephonic instrument as a function of the indicated mode, said control system including a mixer that mixes the electrical signals from the sound-generating device with the microphone electrical signals, for a given indicated mode.

2. An integrated sound/telephone headset system according to claim 1, wherein the control system connects the telephonic instrument to the headset to enable the transmission of electrical signals to the headset to produce sound and the transmission of microphone electrical signals to the telephonic instrument, when a telephone mode is indicated.

3. An integrated sound/telephone headset system according to claim 2, wherein the control system sets the telephonic instrument on-line to the public switched telephone network, when the telephone mode is indicated.

4. An integrated sound/telephone headset system according to claim 3, wherein the control system includes a handset lifter device that lifts a handset from the telephonic instrument to enable the telephonic instrument to be set on-line.

5. An integrated sound/telephone headset system according to claim 1, wherein the operation of the sound-generating device can be paused, and the control system includes a pause control device that pauses the sound-generating device for a given indicated mode.

6. An integrated sound/telephone headset system according to claim 1, wherein the control system connects the sound-generating device to the headset to enable the transmission of electrical signals to the headset to produce sound, when a sound mode is indicated.

7. An integrated sound/telephone headset system according to claim 1, wherein the indicating means for indicating a mode comprises a position sensor that senses a position of the microphone, the position being indicative of the mode.

8. An integrated sound/telephone headset system according to claim 1, wherein the indicating means for indicating a mode detects a verbal command through the microphone that indicates the mode.

9. An integrated sound/telephone headset system according to claim 1, wherein the means for indicating a mode can detect a ring signal on the public switched telephone network, and will indicate the mode in response to detecting a ring signal.

10. An integrated sound/telephone headset system according to claim 1, wherein the control system can detect a ring signal on the public switched telephone network, and will transmit electrical signals representing the ring signal to the headset to generate a ringing sound in the headset.

11. An integrated sound/telephone headset system according to claim 1, wherein the control system can detect a ring signal on the public switched telephone network, and further mixes electrical signals representing the ring signal.

12. An integrated sound/telephone headset system according to claim 1, wherein said at least one sound-generating device comprises a computer system.

13. An integrated sound/telephone headset system according to claim 1, wherein the sound-generating device generates electrical signals representative of music.

14. A control system for use in an integrated sound/telephone headset system having a sound generating device, a telephonic instrument, and a headset having a microphone, said control system connected to said sound-generating device, said telephonic instrument and said headset, said control unit comprising:

means for connecting said headset to said telephonic instrument when said control system is in a telephonic mode;

means for connecting said headset to said sound-generating device when said control system is in a sound mode, and a mixer for mixing electrical signals from said sound-generating device with microphone electrical signals generated by said microphone when said control system is in a selected one of said telephonic and sound modes.

15. The control system of claim 14, wherein said control system is in said telephonic mode when said microphone in said headset is in a lowered position.

16. The control system of claim 15, wherein said control system is in said sound mode when said microphone in said headset is in a raised position.

* * * * *